(12) United States Patent
Brumbaugh et al.

(10) Patent No.: US 8,389,644 B2
(45) Date of Patent: *Mar. 5, 2013

(54) FUNCTIONALIZED POLYMER

(75) Inventors: Dennis R. Brumbaugh, North Canton, OH (US); Steven Luo, Copley, OH (US); Christine Rademacher, Akron, OH (US); Yuan-Yong Yan, Copley, OH (US)

(73) Assignee: Bridgestone Corp., Tokyo (JP)

( * ) Notice: Subject to any disclaimer, the term of this patent is extended or adjusted under 35 U.S.C. 154(b) by 1318 days.

This patent is subject to a terminal disclaimer.

(21) Appl. No.: 11/877,105

(22) Filed: Oct. 23, 2007

(65) Prior Publication Data
US 2008/0103252 A1 May 1, 2008

Related U.S. Application Data

(60) Provisional application No. 60/854,472, filed on Oct. 26, 2006.

(51) Int. Cl.
*C08F 4/52* (2006.01)
*C08F 136/06* (2006.01)
*C08F 236/06* (2006.01)

(52) U.S. Cl. .................. 525/375; 525/331.3; 525/331.9; 525/332.8; 525/333.2; 525/374; 525/192; 526/335; 526/180; 526/217; 526/219.1

(58) Field of Classification Search .............. 525/331.3, 525/331.9, 332.8, 333.2, 374, 375, 192; 526/335, 526/180, 217, 219.1
See application file for complete search history.

(56) References Cited

U.S. PATENT DOCUMENTS

| | | | |
|---|---|---|---|
| 3,095,448 A * | 6/1963 | Biel ............................. | 564/454 |
| 3,194,797 A | 7/1965 | Caldwell et al. | |
| 3,689,554 A * | 9/1972 | Ley et al. ...................... | 564/148 |
| 3,882,152 A * | 5/1975 | Dixon et al. ................... | 560/115 |
| 4,171,413 A | 10/1979 | Hartman et al. | |
| 4,172,188 A | 10/1979 | Ballé et al. | |
| 4,564,659 A | 1/1986 | Kataoka et al. | |
| 4,647,625 A | 3/1987 | Aonuma et al. | |
| 4,791,174 A | 12/1988 | Bronstert et al. | |
| 4,816,520 A | 3/1989 | Bronstert | |
| 4,972,023 A * | 11/1990 | Bronstert ...................... | 525/285 |
| 5,292,790 A * | 3/1994 | Shimizu et al. ................ | 524/496 |
| 5,902,856 A * | 5/1999 | Suzuki et al. .................. | 525/237 |
| 6,977,281 B1 | 12/2005 | Ozawa et al. | |
| 7,378,464 B2 * | 5/2008 | Aoki ............................. | 524/189 |
| 7,932,316 B2 * | 4/2011 | Yan et al. ..................... | 524/500 |
| 8,183,326 B2 * | 5/2012 | Yan et al. ..................... | 525/331.9 |
| 2006/0052260 A1 | 3/2006 | Duyck et al. | |
| 2007/0037956 A1 | 2/2007 | Hogan et al. | |
| 2007/0149717 A1 | 6/2007 | Luo et al. | |
| 2007/0293622 A1 | 12/2007 | Yan | |
| 2008/0027171 A1 | 1/2008 | Yan et al. | |

FOREIGN PATENT DOCUMENTS

| | | | |
|---|---|---|---|
| JP | 4-246401 A | | 9/1992 |
| WO | WO 01/34659 | * | 5/2001 |

OTHER PUBLICATIONS

S. Rádl, "Crisscross Cycloaddition Reactions," *Aldrichimica Acta*, 1997, vol. 30(3), pp. 97-100 (Sigma-Aldrich Co.; St.. Louis, Missouri, USA).

R. Cohen et al., "Novel Azine Reactivity: Facile N-N Bond Cleavage, C-H Activation, and N-N Coupling Mediated by Rh$^{I**}$," *Angew Chem. Int. Ed.*, 2003, vol. 42, pp. 1949-1952 (Wiley-VCH Verlag GmbH & Co. KGaA; Weinheim, Germany).

D.D. Choytun et al., "Azines possessing strong push-pull donors/acceptors," *Chem. Commun.*, 2004, pp. 1842-1843 (The Royal Society of Chemistry; Great Britain).

M.Y. Khuhawar et al., "Syntheses and Thermoanalytical Studies of Some Schiff Base Polymers Derived from 5,5'-methylene Bis(2-Hydroxyacetophenone)," *Eur. Polym. J.*, 1998, vol. 34, No. 1, pp. 133-135 (Elsevier Science Ltd.; Great Britain).

J. Čermák et al., "Diphosphinoazines (Z,Z)-R$_2$PCH$_2$C(Bu$^1$)=NN=C(Bu1)CH$_2$PR$_2$ with R groups of various sizes and complexes {[(Z,Z)-R$_2$PCH$_2$C(Bu$^1$)=NN=C(Bu$^1$)CH$_2$PR$_2$][η$^3$-CH$_2$C(CH$_3$)=CH$_2$PdCl]$_2$}," *Inorganica Chemica Acta*, 2001, vol. 313, No. 77-86 (Elsevier Science B.V., Netherlands).

M.F.N.N. Carvalho et al., "Activation of a coordinated alkyne by electron transfer . . . ," *Journal of Organometallic Chemistry*, 2000, vol. 598, pp. 318-328 (Elsevier Science S.A.; Netherlands).

A. Singh et al., "Arene ruthenium complexes incorporating imine/azine hybrid-chelating N-N' donor ligands: synthetic, spectral, structural aspects and DFT studies," *Journal of Organometallic Chemistry*, 2004, vol. 689, pp. 1821-1834 (Elsevier B.V.; Netherlands).

M. Chandra et al., "Potential inhibitors of DNA topoisomerase II: ruthenium(II) poly-pyridyl and pyridyl-azine complexes," *Journal of Organometallic Chemistry*, 2004, vol. 689, pp. 2256-2267 (Elsevier B.V.; Netherlands).

S.K. Singh et al., "Helices of ruthenium complexes involving pryidyl-azine ligands: synthesis, spectral, and structural aspects," Journal of Organometallic Chemistry, 2004, vol. 689, pp. 3612-3620 (Elsevier B.V.; Netherlands).

D.A. Edwards et al., "Some aspects of the coordination chemistry of 2-pyridinecarbaldehyde azine, (2-paa) . . . ," Polyhedron, 1998, vol. 17, Nos. 13-14, pp. 2321-2326 (Elsevier Science Ltd.; Great Britain).

(Continued)

*Primary Examiner* — Liam Heincher
*Assistant Examiner* — Michael A Salvitti
(74) *Attorney, Agent, or Firm* — Meredith E. Hooker; Zollinger & Burleson Ltd.

(57) ABSTRACT

A functionalized polymer includes a directly bonded moiety, which can be located at a terminus of the polymer, defined by the formula —NH—NR$^1$R$^2$ where R$^1$ and R$^2$ independently are substituted or unsubstituted alkyl, alkenyl, cycloalkyl, cycloalkenyl, aryl, allyl, aralkyl, alkaryl, or alkynyl groups, or together form a substituted or unsubstituted alkylene, alkenylene, cycloalkylene, cycloalkenylene, or arylene group. The functionalized polymer can be provided by reacting a living polymer with a hydrazone. Such polymers can be used in the production of compositions that include particulate fillers.

20 Claims, No Drawings

OTHER PUBLICATIONS

J. Granifo et al., "Synthesis and characterization of polynuclear complexes of molybdenum carbonyl derivatives with pyridine-2-carbaldehyde azine (pa) and ferrocenylphosphines . . . ," *Polyhedron*, 1998, vol. 17, No. 10, pp. 1729-33 (Elsevier Science Ltd.; Great Britain).

H-Y Noh et al., "Addition reactions to chiral aziridine-2-carboxaldimine toward various enantiopure nitrogen-containing heterocycles," *Tetrahedron*, 2005, vol. 61, pp. 9281-9290 (Elsevier Ltd.; Great Britain).

Y-G Lim et al., "Rhodium-catalyzed alkylation of aromatic azines with alkenes via C-H bond activation," *Tetrahedron Letters*, 2005, vol. 46, pp. 385-388 (Elsevier Ltd.; Great Britain).

A. Hashidzume et al., "Preparation and Polymerization of Benzaldehyde Formaldehyde Azine (1-Phenyl-2,3-diaza-1,2-butadiene)," *Macromolecules*, 2000, vol. 33, pp. 2397-2402 (American Chemical Society; Washington, DC).

O. Nuyken et al., "Azo polymers—synthesis and reactions, 3," *Makromol. Chem.*, 1989, vol. 190, pp. 469-475 (Wiley-VCH Verlag GmbH; Wernheim, Germany).

D. Enders et al., "Enantioselective Synthesis of α-Substituted Primary Amines by Nucleophilic Addition to Aldehyde-Samp Hydrazones," *Angew. Chem. Int. Ed. Engl.*, 1986, vol. 25, No. 12, pp. 1109-1110 (VCH Verlagsgesellschaft mbH; Wernheim, Germany).

A. Harada et al., "Polymerization of Azabutadiene (Azine) Derivatives. Preparation of a Stereoregular Polymer from Prionaldehyde Azine," *Macromolecules*, 1991, vol. 24, pp. 5504-5507 (American Chemical Society; Washington, DC).

D. Enders et al., "Asymmetric synthesis of amines by nucleophilic 1,2-addition of organometallic reagents to the CN-double bond," *Tetrahedron: Asymmetry*, 1997, vol. 9, No. 12, pp. 1895-1946 (Elsevier Science Ltd.; Great Britain).

A. Hashidzume et al., "Preparation and Polymerization of Benzaldehyde Formaldehyde Azine (1-Phenyl-2,3-diaza-1,2-butadiene)," *Macromolecules*, 2000, vol. 33, pp. 2397-2402 (American Chemical Society; Washington, DC).

G.K. Friestad, "Chiral N-Acylhydrazones: Versatile Imino Acceptors for Axymmetric Amine Synthesis," *Eur. J. Org. Chem.*, 2005, pp. 3157-3172 (Wiley-VCH Verlag GmbH & Co. KGaA; Wernheim, Germany).

* cited by examiner

FUNCTIONALIZED POLYMER

CROSS-REFERENCE TO RELATED APPLICATIONS

This application claims priority to and the benefit of U.S. provisional patent application 60/854,472, filed Oct. 26, 2006, the entire disclosure of which is incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemically modifying the polymer, typically at a terminus thereof.

Various elastomeric materials often are used in the manufacture of vulcanizates such as, e.g., tire components. In addition to natural rubber, some of the most commonly employed include high-cis polybutadiene, often made by processes employing catalysts, and substantially random styrene/butadiene interpolymers, often made by processes employing anionic initiators. Functionalities that can be incorporated into high-cis polybutadiene often cannot be incorporated into anionically initiated styrene/butadiene interpolymers and vice versa.

SUMMARY

In one aspect is provided a polymer that includes a directly bonded hydrazone radical, which optionally can be located at a terminus of the polymer. This can be provided by reacting a carbanionic (living) polymer with a hydrazone compound.

In another aspect is provided a macromolecule that includes a polymer chain and, directly bonded to the chain, a moiety defined by the formula

$$-NH-NR^1R^2 \quad (I)$$

where $R^1$ and $R^2$ each independently is a substituted or unsubstituted alkyl, alkenyl, cycloalkyl, cycloalkenyl, aryl, allyl, aralkyl, alkaryl, or alkynyl groups, or together form a substituted or unsubstituted alkylene, alkenylene, cycloalkylene, cycloalkenylene, or arylene group.

In another aspect is provided a method of providing a functionalized polymer. The method includes reacting a carbanionic polymer with a hydrazone so as to provide a polymer that includes hydrazine functionality. In certain aspects, one of the nitrogen atoms constituting the hydrazine functionality can constitute one of the atoms of a cyclic moiety. Optionally, the hydrazine functionality can be reduced to a primary amine group.

In another aspect is provided a method of providing amine functionality to a polymer. The method includes reacting a carbanionic polymer with a hydrazone so as to provide a polymer that includes amine functionality. In certain aspects, the amine functionality can be a cyclic structure in which the amino nitrogen constitutes an atom of the ring structure. If desired, the functionality can be reduced to a primary amine.

Regardless of how characterized, the polymer can interact with particulate filler such as, e.g., carbon black. Compositions, including vulcanizates, that include particulate fillers and such polymers also are provided, as are methods of providing and using such compositions.

In any or each of these aspects, the polymer can include directly bonded aromatic pendent groups, can be substantially linear, and/or can include unsaturation within and/or pendent from the polymer chain. This unsaturation can result from incorporation of polyene mer units and preferably is substantially random along the polymer chain.

Other aspects of the invention will be apparent to the ordinarily skilled artisan from the description of illustrative embodiments that follows. To assist in understanding the following description of various embodiments, certain definitions are provided immediately below. These are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —CH$_2$CH$_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetra-polymers, and the like;

"carbanionic" and "living" are used interchangeably;

"hydrazone" means a compound that include a >C=N—N< unit;

"hydrazine" means a compound that include a —NH—N< unit;

"substituted" means one containing a heteroatom or functionality (e.g., hydrocarbyl group) that does not interfere with the intended purpose of the group in question;

"directly bonded" means covalently attached with no intervening or interposed atoms or groups;

"polyene" means a molecule with at least two double bonds located in the longest portion or chain thereof, and specifically is inclusive of dienes, trienes, and the like;

"radical" means that portion of a molecule which remains after reacting with another molecule, regardless of whether any atoms are gained or lost as a result of the reaction;

"terminus" means an end of a polymeric chain; and

"terminal moiety" means a group or functionality located at a terminus.

Throughout this document, all values given in the form of percentages are weight percentages unless the surrounding text explicitly indicates a contrary intention.

The entire disclosure of each patent document mentioned hereinthroughout is incorporated herein by reference.

DETAILED DESCRIPTION OF ILLUSTRATIVE EMBODIMENTS

As apparent from the above Summary, the polymer can be described or characterized in a variety of ways. Generally, it includes a moiety defined by formula (I). This polymer can be provided by reacting a hydrazone compound with a carbanionic (living) polymer, advantageously one that includes pendent aromatic groups and unsaturation within or pendent from the polymer chain.

The polymer can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene.

Directly bonded pendent aromatic groups can be provided through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute from about 1 to about 50%, from about 10 to about 45%, or from about 20 to about 35%, of the polymer chain. The microstructure of such interpolymers can be random, which means that the mer units derived from each type of constituent monomer generally do not form blocks and, instead, are incorporated in a non-repeating, essentially simultaneous manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

Polyenes can incorporate into polymeric chains in more than one way. Especially for rubber compositions intended for tire tread applications, controlling this manner of polyene incorporation can be desirable. A polymer chain with an overall 1,2-microstructure, given as a numerical percentage based on total polyene content, of from about 10 to about 80%, optionally from about 25 to 65%, can be desirable for certain end use applications. A polymer that has an overall 1,2-microstructure of no more than about 50%, preferably no more than about 45%, more preferably no more than about 40%, even more preferably no more than about 35%, and most preferably no more than about 30%, based on total polyene content, is considered to be substantially linear.

The number average molecular weight ($M_n$) of the polymer typically is such that a quenched sample exhibits a gum Mooney viscosity ($ML_4/100°$ C.) of from ~2 to ~150, more commonly from ~2.5 to ~125, even more commonly from ~5 to ~100, and most commonly from ~10 to ~75.

These types of polymers can be made by any of a variety of polymerization techniques. Solution polymerization generally affords a higher degree of control with respect to such properties as randomness, microstructure, etc., although other techniques, e.g., emulsion polymerization, also can be utilized. Solution polymerizations have been performed since about the mid-20th century, so the general aspects thereof are known to the ordinarily skilled artisan; nevertheless, certain aspects are provided here for convenience of reference.

Solution polymerizations typically involve an initiator as opposed to, e.g., a catalyst. Exemplary initiators include organolithium compounds, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkylstanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functionalized initiators which become incorporated into the polymer chain, thus providing a functional group at the initiated end of the chain, also can be used. Examples of such materials include lithiated aryl thioacetals (see, e.g., U.S. Pat. Publ. No. 2006/0030657) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815).

Useful anionic polymerization solvents include $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

In solution polymerizations, both randomization and vinyl content (i.e., 1,2-microstructure) can be increased by including a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2'-di(tetrahydrofuryl) propane, di-piperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerization, a representative description is provided for the convenience of the reader. The following is based on a batch process, although extending this description to, e.g., semi-batch or continuous processes is within the capability of the ordinarily skilled artisan.

Solution polymerizations typically begin by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions due primarily to the moisture and air sensitivity of most initiators and living polymers made therewith. The reactants can be heated up to about 150° C. and agitated. After a desired degree of conversion has been reached, the heat source (if used) can be removed and, if the reaction vessel is to be reserved solely for polymerizations, the reaction mixture is removed to a post-polymerization vessel for functionalization and/or quenching. At this point, the reaction mixture commonly is referred to as a "polymer cement" because of its relatively high concentration of polymer.

The polymer of the present invention includes a moiety defined by formula (I). A convenient manner of providing such a group to the polymer is through introduction of one or more hydrazine functionalities.

One technique for providing hydrazine functionality is to react a carbanionic polymer with one or more hydrazones, several of which are commercially available. Hydrazones also can be formed by condensing an aldehyde or ketone with a compound containing a >N—NH$_2$ group, typically at a 1:1 molar ratio in a suitable solvent; moderate temperatures (e.g., about 10° to about 60° C., often about 20° to about 50° C.) typically are sufficient to allow for fairly complete reaction within a reasonable amount of time (e.g., a few hours). Isolation and purification of the hydrazone can be accomplished by standard procedures such as vacuum distillation, column chromatography, etc.

Compounds containing a >N—NH$_2$ group include those represented by the general formula

R$^1$R$^2$N—NH$_2$  (II)

where R$^1$ and R$^2$ are defined as above in connection with formula (I). Examples of such materials include, but are not limited to, 1,1-dimethylhydrazine, 1,1-diethylhydrazine, 1-methyl-1-ethylhydrazine, 1-methyl-1-phenylhydrazine, etc., as well as amino-substituted heterocyclic compounds such as 1-aminopiperidine, 1-aminopiperazine, 1-amino-4-methylpiperazine, 1-aminopyrrolidine, 1-aminohomopiperidine (i.e., N-aminohexamethyleneimine), 1-aminopyridinium and the like, and similar piperidines and piperazines that include substitution at one or more ring carbon atoms. In certain embodiments, amino-substituted heterocyclic compounds, particularly 1-aminopyrrolidine, 1-aminopiperidine, and 1-aminohomopiperidine, can be preferred.

The condensation reaction employed to form the hydrazone can employ a ketone or an aldehyde. The following discussion focuses on aldehydes, but the ordinarily skilled artisan easily can extend the teaching so as to provide a similar list of ketones.

Aldehydes that can be used in forming useful hydrazones are not particularly limited from a structural perspective. Non-limiting examples of potentially useful aldehydes include formaldehyde; alkyl aldehydes such as ethanal (acetaldehyde), propanal (propionaldehyde), butanal (butyraldehyde), pentanal (valeraldehyde), hexanal (caproaldehyde), heptanal, octanal, etc.; cycloalkanecarboxaldehydes such as cyclopentanecarboxaldehyde, cyclohexanecarboxaldehyde, cycloheptanecarboxaldehyde, cyclooctanecarboxaldehyde, etc.; aromatic compounds with aldehyde functionality such as benzaldehyde and any of a variety of substituted benzaldehydes including, but not limited to, 2-, 3-, or 4-dimethylaminobenzaldehyde; heterocyclic compounds with aldehyde functionality such as 2-, 3-, or 4-pyridine carboxaldehyde, 2- or 3-pyrrole carboxaldehyde, 2- or 3-furaldehyde, N-methylpyrrole-2-carboxaldehyde, and N-methylimidazole-2-carboxaldehyde; and metallocene aldehydes such as ferrocenecarboxaldehyde. In certain embodiments, hydrazones made from alkyl aldehydes, particularly propanal and butanal, and cycloalkanecarboxaldehydes, particularly cyclohexanecarboxaldehyde, can be preferred.

Exemplary hydrazones can be described by the general formula

(III)

where R$^1$ and R$^2$ are as defined above in connection with formula (I) and R$^3$ and R$^4$ independently are H or a substituted or unsubstituted alkyl, alkenyl, cycloalkyl, cycloalkenyl, aryl, allyl, aralkyl, alkaryl, or alkynyl group, or together form a substituted or unsubstituted alkylene, alkenylene, cycloalkylene, cycloalkenylene, or arylene group.

Preferred hydrazones include those that result from the condensation of an amino-substituted heterocyclic compound, particularly 1-aminopiperidine, 1-aminopyrrolidine, or 1-aminohomopiperidine, and an alkyl aldehyde, particularly C$_2$-C$_6$ alkyl aldehydes such as propanal and butanal, or a cycloalkanecarboxaldehyde, particularly cyclohexanecarboxaldehyde. One representative material falling in this class is cyclohexanecarboxaldehydepiperidinehydrazone.

A hydrazone radical can be provided as a terminal moiety by functionalizing a polymer prior to quenching, advantageously when it is in the aforementioned polymer cement state. One method of effecting this functionalization involves introducing to the polymer cement one or more hydrazones and allowing such hydrazone(s) to react at the living terminus of the polymer. The carbon atom of the >C=N—N< group from the hydrazone is believed to add to the carbanionic polymer chain which results, after quenching with an active hydrogen-containing compound (e.g., water, an alcohol, an acid, etc.), in a terminal moiety represented by the formula —NH—NR$^1$R$^2$ (formula I) where R$^1$ and R$^2$ each independently is a substituted or unsubstituted alkyl, alkenyl, cycloalkyl, cycloalkenyl, aryl, allyl, aralkyl, alkaryl, or alkynyl groups, or together form a substituted or unsubstituted alkylene, alkenylene, cycloalkylene, cycloalkenylene, or arylene group. (In the foregoing, the terms substituted cycloalkylene and cycloalkenylene embody such heterocyclic compounds as morpholine and derivatives thereof, N-alkyl-piperazines, pyridines, and the like.) One exemplary terminal moiety is —NH-Pip where Pip represents piperidinyl functionality (which can be provided from a compound of general formula (II) with R$^1$ and R$^2$ together constituting a 5-carbon alkylene group). In certain embodiments, providing this functionality from one of the previously described preferred hydrazones can result in polymers that display particularly advantageous properties when compounded with, inter alia, reinforcing fillers such as carbon black.

Reaction of the hydrazone with a living polymer can be performed relatively quickly (a few minutes to a few hours) at moderate temperatures (e.g., 0° to 75° C.).

Although certainly not required, a terminal moiety such as that represented by formula I can be converted to primary amine functionality through use of a reducing agent such as, e.g., any of a variety of metals (notably zinc, particularly under acidic conditions) or Na$_2$S$_2$O$_4$.

Quenching can be conducted by stirring the polymer and an active hydrogen-containing compound, such as an alcohol or acid, for up to about 120 minutes at temperatures of from about 25° to about 150° C.

Solvent can be removed from the quenched polymer cement by conventional techniques such as drum drying, extruder drying, vacuum drying or the like, which may be combined with coagulation with water, alcohol or steam, thermal desolventization. If coagulation is performed, oven drying may be desirable.

The resulting polymer can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, ethylene/propylene rubber, ethylene/propylene/diene rubber, acrylonitrile/butadiene rubber, silicone rubber, fluoroelastomers, ethylene/acrylic rubber, ethylene/vinyl acetate interpolymer, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% of the total rubber, with the conventional rubber(s) making up the balance of the total rubber. The minimum amount depends to a significant extent on the degree of hysteresis reduction desired.

Elastomeric compounds typically are filled to a volume fraction, which is the total volume of filler(s) added divided by the total volume of the elastomeric stock, often ~25%; typical (combined) amounts of reinforcing fillers range from about 30 to about 100 phr, with the upper end of the range being defined largely by how effectively processing equipment can handle the increased viscosities imparted when such fillers are employed.

Useful fillers include various forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least about 35 $m^2/g$, are preferred; surface area values can be determined by ASTM D-1765 using the cetyltrimethyl-ammonium bromide (CTAB) technique. The carbon blacks may be in pelletized form or an unpelletized flocculent mass, although unpelletized carbon black can be preferred for use in certain mixers.

The amount of carbon black can be up to about 50 phr, with about 5 to about 40 phr being typical.

Amorphous silica ($SiO_2$) also can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface areas of silicas generally are less than 450 $m^2/g$, commonly from ~32 to ~400 $m^2/g$ or from ~100 to ~250 $m^2/g$ or from ~150 to ~220 $m^2/g$.

The pH of the silica filler (when used) is generally from about 5 to about 7 or slightly over, preferably from about 5.5 to about 6.8.

Commercially available silicas include various grades of Hi-Sil™ powdered and granular silicas (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of about 1 to about 100 parts by weight (pbw) per 100 parts of polymer (phr), preferably in an amount from about 5 to about 80 phr. When used with carbon black, the amount of silica can be decreased to as low as about 1 phr; as the amount of silica decreases, lesser amounts of the processing aids, plus silane if any, can be employed.

When silica is employed, a coupling agent such as a silane often is added so as to ensure good mixing in, and interaction with, the elastomer(s). Generally, the amount of silane that is added ranges between about 4 and 20%, based on the weight of silica filler present in the elastomeric compound.

Coupling agents can have a general formula of A-T-X, in which A represents a functional group capable of bonding physically and/or chemically with a group on the surface of the silica filler (e.g., surface silanol groups); T represents a hydrocarbon group linkage; and X represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the X and A functionalities mentioned above. An exemplary coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants are also useful, as set forth below. The additional fillers can be utilized in an amount of up to about 40 phr, typically up to about 20 phr.

Other conventional rubber additives also can be added. These include, for example, process oils, plasticizers, anti-degradants such as antioxidants and antiozonants, curing agents and the like.

All ingredients can be mixed with standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, Encyclopedia of *Chem. Tech.*, 3d ed., (Wiley Interscience, New York, 1982), vol. 20, pp. 365-468. Vulcanizing agents, accelerators, etc., are added at a final mixing stage. To reduce the chances of undesirable scorching and/or premature onset of vulcanization, this mixing step often is done at lower temperatures, e.g., starting at ~60° to ~65° C. and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly about 170° C.

The following non-limiting, illustrative examples provide the reader with detailed conditions and materials that can be useful in the practice of the present invention.

EXAMPLES

In the examples, dried glass vessels previously sealed with extracted septum liners and perforated crown caps under a positive $N_2$ purge were used for all preparations. Butadiene (22.1% in hexane), styrene (33% in hexane), hexane, n-butyllithium (1.60 M in hexane), 2,2-bis(2'-tetrahydrofuryl)propane solution (1.6 M solution in hexane, stored over $CaH_2$), and butylated hydroxytoluene (BHT) solution in hexane were used.

Commercially available reagents and starting materials included the following (with as-purchased purities given in parentheses), all of which were acquired from Sigma-Aldrich Co. (St. Louis, Mo.) and used without further purification unless otherwise noted in a specific example: cyclohexanecarbaldehyde (98%), 2-pyridinecarboxaldehyde (99%), N-methyl-2-pyrrolecarboxaldehyde (98%), pyridine (99%), formaldehyde solution, propanal (97%), butanal (99.5%), acetone (99.9%), benzaldehyde (99.5%), N-methylimidazole-2-carboxaldehyde (98%), 4-dimethylaminobenzaldehyde (99%), ferrocenecarboxaldehyde (98%), 2-furaldehyde (99%), 1-aminopiperidine (97%), 1-amino-4-methylpiperazine (97%), 1-amino-homopiperidine (95%), 1,1-dimethyl hydrazine (98%), and 1-methyl-1-phenyl hydrazine (97%).

The hydrazone materials utilized in the examples were prepared through a series of condensation reactions in pyridine involving equimolar amounts of a variety of aldehydes or ketones and a variety of formula (II) compounds. The reagents used to prepare each type of hydrazone employed in the examples is given below in Table 1.

TABLE 1

Reagents used to make hydrazones

| Example | Aldehyde or ketone | Formula II compound |
|---|---|---|
| 2 | formaldehyde | 1-aminopiperidine |
| 3 | propanal | 1-aminopiperidine |
| 4 | butanal | 1-aminopiperidine |
| 5 | cyclohexanecarboxaldehyde | 1-aminopiperidine |
| 6 | acetone | 1-aminopiperidine |
| 7 | benzaldehyde | 1-aminopiperidine |
| 8 | 2-pyridinecarboxaldehyde | 1-aminopiperidine |
| 9 | N-methyl-2-pyrrolecarboxaldehyde | 1-aminopiperidine |
| 10 | N-methyl-2-imidazole-2-carboxaldehyde | 1-aminopiperidine |
| 11 | 4-dimethylaminobenzaldehyde | 1-aminopiperidine |
| 12 | ferrocene aldehyde | 1-aminopiperidine |
| 13 | cyclohexanecarboxaldehyde | 1-amino-4-methylpiperazine |
| 14 | cyclohexanecarboxaldehyde | 1,1-dimethylhydrazine |

TABLE 1-continued

Reagents used to make hydrazones

| Example | Aldehyde or ketone | Formula II compound |
|---|---|---|
| 15 | benzaldehyde | 1,1-dimethylhydrazine |
| 16 | 2-furaldehyde | 1,1-dimethylhydrazine |
| 17 | cyclohexanecarboxaldehyde | 1-methyl-1-phenylhydrazine |

Isolation and purification of each involved standard techniques including vacuum distillation and column chromatography (utilizing eluting solvents such as ethyl acetate and hexane (20:80 mixture) and diethyl ether and hexane (10:90 mixture)). A 1.0 M solution was prepared from each purified hydrazone, using hexane as solvent for aliphatic hydrazones and toluene as solvent for aromatic hydrazones.

Testing data in the Examples was performed on filled compositions made according to the formulation shown in Tables 2a (carbon black only) and 2b (carbon black and silica). In these tables, N-phenyl-N'-(1,3-dimethylbutyl)-p-phenylenediamine acts as an anti-oxidant, benzothiazyl-2-cyclohexylsulfenamide and N,N'-diphenylguanidine act as accelerators, and N-(cyclohexylthio)phthalimide acts as an inhibitor against premature vulcanization.

TABLE 2a

Compound formulation, carbon black only

| | Amount (phr) |
|---|---|
| Masterbatch | |
| polymer | 100 |
| carbon black (N343 type) | 55 |
| wax | 1 |
| N-phenyl-N'-(1,3-dimethylbutyl)-p-phenylenediamine | 0.95 |
| ZnO | 2.5 |
| stearic acid | 2 |
| aromatic processing oil | 10 |
| Final | |
| sulfur | 1.3 |
| N-cyclohexylbenzothiazole-2-sulfenamide | 1.7 |
| N,N'-diphenylguanidine | 0.2 |
| TOTAL | 174.65 |

TABLE 2b

Compound formulation, carbon black and silica

| | Amount (phr) |
|---|---|
| Masterbatch | |
| polymer | 100 |
| silica | 30 |
| carbon black (N343 type) | 35 |
| N-phenyl-N'-(1,3-dimethylbutyl)-p-phenylenediamine | 0.95 |
| stearic acid | 1.5 |
| aromatic processing oil | 10 |
| Re-mill | |
| 60% disulfide silane on carrier | 4.57 |
| Final | |
| ZnO | 2.5 |
| sulfur | 1.7 |
| N-cyclohexylbenzothiazole-2-sulfenamide | 1.5 |

TABLE 2b-continued

Compound formulation, carbon black and silica

| | Amount (phr) |
|---|---|
| N-(cyclohexylthio)phthalimide | 0.25 |
| N,N'-diphenylguanidine | 0.5 |
| TOTAL | 188.47 |

Data corresponding to "50° C. Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and 50° C.

Data corresponding to "Dispersion index" were calculated using the equation $$DI = 100 - \exp[A \times \log_{10}(F^2H) + B]$$

where F is the number of roughness peaks/cm, H is the average roughness peak height, and A and B are constants from Method B in ASTM-D 2663-89. The F and H contour data were acquired by analyzing cut samples (~3.5×2×0.2 cm) with a Surfanalyzer™ profilometer (Mahr Federal Inc.; Providence, R.I.), using the procedure described in Method C (from ASTM-D 2663-89).

Data corresponding to "Bound rubber" were determined using the procedure described by J. J. Brennan et al., *Rubber Chem. and Tech.*, 40, 817 (1967).

Examples 1-17

To a $N_2$-purged reactor equipped with a stirrer was added 1.61 kg hexane, 0.41 kg styrene solution, and 2.46 kg butadiene solution. The reactor was charged with 3.60 mL n-butyllithium, followed by 1.05 mL of 2,2-bis(2'-tetrahydrofuryl)propane solution. The reactor jacket was heated to 50° C. and, after ~26 minutes, the batch temperature peaked at ~66° C.

After an additional ~30 minutes, polymer cement was transferred from the reactor to dried glass vessels. A control (sample 1) was quenched with isopropanol.

Each of 16 other samples were terminated (50° C. bath for 30 minutes) with 6 mL of one of the 1.0 M solutions of the hydrazone products provided from the reactants set forth in Table 1 in an additional 20 mL of the solvent used to make the 1.0 M solution.

These and the control (sample 1) were coagulated in isopropanol containing BHT and drum dried.

Using the formulation from Table 2a above, vulcanizable elastomeric compounds containing reinforcing fillers were prepared from samples 1-17. Results of physical testing on these compounds are shown below in Table 3.

TABLE 3

| Testing data from Examples 1-6 | | | | | | |
|---|---|---|---|---|---|---|
| | 1 | 2 | 3 | 4 | 5 | 6 |
| $M_n$ (kg/mol) | 131 | 113 | 126 | 113 | 126 | 107 |
| $M_w/M_n$ | 1.06 | 1.04 | 1.05 | 1.06 | 1.05 | 1.07 |
| % coupling | 0 | 0.0 | 1.9 | 2.7 | 2.5 | 5.2 |
| $T_g$ (° C.) | −35.9 | −35.6 | −33.0 | −37.9 | −35.9 | −38.3 |
| Dispersion index | 96.5 | 98.2 | 95.1 | 96.2 | 95.4 | 97.3 |
| Bound rubber (%) | 13.9 | 23.5 | 37.1 | 35.8 | 36.5 | 25.5 |
| 171° C. MDR $t_{50}$ (min) | 2.73 | 2.51 | 2.46 | 2.04 | 1.92 | 2.43 |
| 171° C. MH-ML (kg-cm) | 19.8 | 18.5 | 16.1 | 16.3 | 16.7 | 17.6 |
| $ML_{1+4}$ @ 130° C. | 32.0 | 29.1 | 48.7 | 41.4 | 52.2 | 27.3 |
| 300% modulus @ 23° C. (MPa) | 13.2 | 12.4 | 12.8 | 13.9 | 14.6 | 10.8 |
| Tensile strength @ 23° C. (MPa) | 15.5 | 18.8 | 18.6 | 22.4 | 22.8 | 17.5 |
| Temp. sweep 0° C. tan δ | 0.228 | 0.218 | 0.288 | 0.226 | 0.279 | 0.207 |
| Temp. sweep 50° C. tan δ | 0.258 | 0.235 | 0.165 | 0.169 | 0.160 | 0.218 |
| RDA 0.25-14% ΔG' (MPa) | 3.885 | 2.121 | 0.614 | 0.642 | 0.584 | 1.812 |
| 50° C. RDA strain sweep (5% strain) tan δ | 0.2196 | 0.1698 | 0.1157 | 0.1113 | 0.1030 | 0.1857 |
| 50° C. Dynastat tan δ | 0.2062 | 0.1674 | 0.1210 | 0.1100 | 0.1060 | 0.1782 |

| Testing data from Examples 7-12 | | | | | | |
|---|---|---|---|---|---|---|
| | 7 | 8 | 9 | 10 | 11 | 12 |
| $M_n$ (kg/mol) | 128 | 148 | 127 | 102 | 106 | 109 |
| $M_w/M_n$ | 1.04 | 1.16 | 1.05 | 1.07 | 1.04 | 1.06 |
| % coupling | 0.0 | 27.1 | 0.0 | 3.3 | 0.0 | 2.8 |
| $T_g$ (° C.) | −35.8 | −35.9 | −35.9 | −36.8 | −35.6 | −35.5 |
| Dispersion index | 94.8 | 92.8 | 94.5 | 96.3 | 93.8 | 97.7 |
| Bound rubber (%) | 33.9 | 26.1 | 27.6 | 25.5 | 24.1 | 25.4 |
| 171° C. MDR $t_{50}$ (min) | 2.23 | 2.51 | 2.24 | 2.35 | 2.49 | 2.24 |
| 171° C. MH-ML (kg-cm) | 17.8 | 18.2 | 18.3 | 18.7 | 16.8 | 17.5 |
| $ML_{1+4}$ @ 130° C. | 42.2 | 52.0 | 39.2 | 34.3 | 28.6 | 29.2 |
| 300% modulus @ 23° C. (MPa) | 14.0 | 14.4 | 13.5 | 12.1 | 11.5 | 12.1 |
| Tensile strength @ 23° C. (MPa) | 19.1 | 22.6 | 19.2 | 18.7 | 19.6 | 19.2 |
| Temp. sweep 0° C. tan δ | 0.266 | 0.243 | 0.243 | 0.225 | 0.221 | 0.217 |
| Temp. sweep 50° C. tan δ | 0.188 | 0.216 | 0.218 | 0.218 | 0.232 | 0.231 |
| RDA 0.25-14% ΔG' (MPa) | 0.969 | 1.513 | 1.467 | 1.917 | 1.706 | 1.814 |
| 50° C. RDA strain sweep (5% strain) tan δ | 0.1230 | 0.1377 | 0.1454 | 0.1619 | 0.1802 | 0.1738 |
| 50° C. Dynastat tan δ | 0.1217 | 0.1378 | 0.1426 | 0.1521 | 0.1663 | 0.1698 |

TABLE 3-continued

Testing data from Examples 13-17

|  | 13 | 14 | 15 | 16 | 17 |
|---|---|---|---|---|---|
| $M_n$ (kg/mol) | 113 | 110 | 111 | 125 | 122 |
| $M_w/M_n$ | 1.13 | 1.05 | 1.05 | 1.05 | 1.05 |
| % coupling | 21.5 | 2.4 | 2.6 | 0.0 | 1.7 |
| $T_g$ (° C.) | −37.1 | −36.3 | −35.3 | −36.9 | −34.5 |
| Dispersion index | 95.9 | 97.4 | 97.2 | 93.0 | 97.6 |
| Bound rubber (%) | 28.9 | 22.4 | 20.3 | 22.7 | 17.0 |
| 171° C. MDR $t_{50}$ (min) | 2.48 | 2.48 | 2.42 | 2.44 | 2.82 |
| 171° C. MH-ML (kg-cm) | 17.6 | 18.4 | 18.1 | 19.1 | 18.5 |
| $ML_{1+4}$ @ 130° C. | 35.7 | 28.1 | 27.8 | 34.2 | 30.0 |
| 300% modulus @ 23° C. (MPa) | 11.3 | 12.0 | 11.2 | 13.2 | 11.2 |
| Tensile strength @ 23° C. (MPa) | 18.8 | 19.9 | 18.8 | 19.0 | 17.2 |
| Temp. sweep 0° C. tan δ | 0.209 | 0.217 | 0.209 | 0.222 | 0.216 |
| Temp. sweep 50° C. tan δ | 0.231 | 0.241 | 0.247 | 0.242 | 0.239 |
| RDA 0.25-14% ΔG' (MPa) | 2.320 | 2.284 | 2.712 | 2.191 | 3.680 |
| 50° C. RDA strain sweep (5% strain) tan δ | 0.1943 | 0.1895 | 0.2117 | 0.1719 | 0.2354 |
| 50° C. Dynastat tan δ | 0.1873 | 0.1679 | 0.1894 | 0.1679 | 0.2210 |

From the data of Table 3, one can see that styrene/butadiene interpolymers having terminal —NH—$NR^1R^2$ functionalization can provide excellent combinations of physical properties such as 50° C. strain sweep tan δ (an indicator of reduced hysteresis), bound rubber, modulus, tensile strength, ΔG', etc., in carbon black-only formulations Compared to a control interpolymer, such functionalized interpolymers can exhibit significant reductions in tan δ, up to 50% for each of Examples 3-5 for example.

Using the formulation from Table 2b above, vulcanizable elastomeric compounds containing reinforcing fillers were prepared from samples 1, 5, 11-12, and 14-15. Results of physical testing on these compounds are shown below in Table 4.

TABLE 4

Testing data, mixed filler formulation

|  | 1 | 5 | 11 | 12 | 14 | 15 |
|---|---|---|---|---|---|---|
| $M_n$ (kg/mol) | 131 | 126 | 106 | 109 | 110 | 111 |
| $M_w/M_n$ | 1.06 | 1.05 | 1.04 | 1.06 | 1.05 | 1.05 |
| % coupling | 0 | 2.5 | 0.0 | 2.8 | 2.4 | 2.6 |
| $T_g$ (° C.) | −35.9 | −35.9 | −35.6 | −35.5 | −36.3 | −35.3 |
| Dispersion index | 79.3 | 77.4 | 76.5 | 81.6 | 77.4 | 81.4 |
| Bound rubber (%) | 15.1 | 39.1 | 33.0 | 25.9 | 35.6 | 32.5 |
| 171° C. MDR $t_{50}$ (min) | 4.44 | 3.44 | 4.28 | 4.08 | 4.12 | 4.26 |
| 171° C. MH-ML (kg-cm) | 24.02 | 20.04 | 22.87 | 23.67 | 22.82 | 22.45 |
| $ML_{1+4}$ @ 130° C. | 32.5 | 53.6 | 37.3 | 33.1 | 44.8 | 45.4 |
| 300% modulus @ 23° C. (MPa) | 12.6 | 18.3 | 14.4 | 13.6 | 15.6 | 14.5 |
| Tensile strength @ 23° C. (MPa) | 14.3 | 17.8 | 13.8 | 14.7 | 17.1 | 14.9 |
| Temp. sweep 0° C. tan δ | 0.209 | 0.245 | 0.217 | 0.208 | 0.223 | 0.221 |
| Temp. sweep 50° C. tan δ | 0.231 | 0.184 | 0.221 | 0.226 | 0.215 | 0.213 |
| RDA 0.25-14% ΔG' (MPa) | 7.641 | 0.832 | 4.543 | 6.431 | 3.790 | 3.205 |
| 50° C. RDA strain sweep (5% strain) tan δ | 0.2231 | 0.1185 | 0.1903 | 0.2125 | 0.1726 | 0.1686 |
| 50° C. Dynastat tan δ | 0.1978 | 0.1170 | 0.1706 | 0.1826 | 0.1566 | 0.1472 |

From the data of Table 4, one can see that hydrazine-functional polymers exhibit and excellent combination of physical properties such as 50° C. strain sweep tan δ (an indicator of reduced hysteresis), bound rubber, modulus, tensile strength, ΔG', etc., in a mixed filler formulation.

That which is claimed is:

1. A functionalized polymer comprising a polymer chain that comprises polyene mer and a moiety defined by the formula

—NH—$NR^1R^2$ where $R^1$ and $R^2$, together with the N atom to which they are bonded, form a substituted or unsubstituted cycloalkylene, cycloalkenylene, or arylene group, said moiety being located only at a terminus of said polymer chain.

2. The polymer of claim 1 wherein —$NR^1R^2$ is a piperidinyl, pyrrolinyl, or homopiperidinyl group.

3. The polymer of claim 1 wherein said polymer chain further comprises pendent aromatic groups.

4. The polymer of claim 1 wherein said polymer has an overall 1,2-microstructure of no more than about 50% based on total polyene content.

5. The polymer of claim 4 wherein said polymer has an overall 1,2-microstructure of no more than 50% based on total polyene content.

6. The polymer of claim 4 wherein said polymer has an overall 1,2-microstructure of no more than about 40% based on total polyene content.

7. A polymer comprising the reaction product of a carbanionic polymer and at least one hydrazone compound that comprises amino-substituted heterocyclic group functionality.

8. The polymer of claim 7 wherein said hydrazone further comprises cycloalkane functionality.

9. The polymer of claim 8 wherein said hydrazone comprises the reaction product of cycloalkanecarboxaldehyde and an amino-substituted heterocyclic compound.

10. The polymer of claim 9 wherein said amino-substituted heterocyclic compound is 1-aminopiperidine, 1-aminopyrrolidine, or 1-aminohomopiperidine.

11. The polymer of claim 7 wherein said hydrazone is defined by the formula

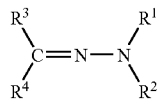

where $R^1$ and $R^2$, together with the N atom to which they are bonded, form a substituted or unsubstituted cycloalkylene, cycloalkenylene, or arylene group, and where $R^3$ and $R^4$
are independently H or a substituted or unsubstituted alkyl, alkenyl, cycloalkyl, cycloalkenyl, aryl, allyl, aralkyl, alkaryl, or alkynyl group; or
together form a substituted or unsubstituted alkylene, alkenylene, cycloalkylene, cycloalkenylene, or arylene group.

12. The polymer of claim 7 wherein said polymer comprises polyene mer, said polymer having an overall 1.2-microstructure of no more than about 50% based on total polyene content.

13. The polymer of claim 11 wherein $R^3$ is H and $R^4$ is an alkyl group.

14. The polymer of claim 11 wherein $R^3$ and $R^4$ together form a substituted or unsubstituted cycloalkenylene group.

15. The polymer of claim 12 wherein said polyene mer comprises conjugated diene mer.

16. The polymer of claim 15 wherein said polyene mer consists of conjugated diene mer.

17. The polymer of claim 15 wherein said carbanionic polymer further comprises vinyl aromatic mer.

18. The polymer of claim 17 wherein said carbanionic polymer consists essentially of conjugated diene and vinyl aromatic mer.

19. The polymer of claim 12 wherein said polymer has an overall 1,2-microstructure of no more than 50% based on total polyene content.

20. The polymer of claim 12 wherein said polymer has an overall 1,2-microstructure of no more than about 40% based on total polyene content.

* * * * *